(12) United States Patent
Horrell et al.

(10) Patent No.: US 8,240,711 B1
(45) Date of Patent: Aug. 14, 2012

(54) DEVICE FOR LIFTING AND ATTACHING A TRUCK TIRE AND WHEEL TO A HEAVY FREIGHT VEHICLE

(75) Inventors: Charles Horrell, McGrady, NC (US);
Jeff Grossman, Berkeley, CA (US);
Joshua Kaufman, Northampton, MA (US); Rebecca Schwartz, Newton, MA (US); Drew Ulrich, Winston Salem, NC (US); Laura Weyl, Amherst, MA (US);
Jimmy Ray, Las Cruces, NM (US);
Andrew E. Smith, Redwood City, CA (US)

(73) Assignee: Advanced Transit Dynamics, Inc., South San Francisco, CA (US)

( * ) Notice: Subject to any disclaimer, the term of this patent is extended or adjusted under 35 U.S.C. 154(b) by 150 days.

(21) Appl. No.: 12/563,966

(22) Filed: Sep. 21, 2009

Related U.S. Application Data (60) Provisional application No. 61/098,740, filed on Sep. 19, 2008.

(51) Int. Cl.
*B60R 9/00* (2006.01)
(52) U.S. Cl. ............... 280/769; 414/426; 224/42.12
(58) Field of Classification Search ........... 280/762, 280/769; 414/426, 427; 224/42.12, 42.21, 224/42.23, 42.24
See application file for complete search history.

(56) References Cited

U.S. PATENT DOCUMENTS

| | | | | |
|---|---|---|---|---|
| 3,554,397 | A * | 1/1971 | Cluff | 414/463 |
| 4,548,540 | A * | 10/1985 | Renfro | 414/463 |
| 6,702,365 | B2 * | 3/2004 | Semple et al. | 296/183.1 |
| 6,941,802 | B2 * | 9/2005 | Brown | 73/146 |
| 7,086,664 | B2 * | 8/2006 | Voegeli et al. | 280/769 |
| 7,195,231 | B2 * | 3/2007 | Murphy | 254/323 |
| 7,770,764 | B2 * | 8/2010 | Rock et al. | 224/42.23 |
| 2008/0131246 | A1 * | 6/2008 | Altman | 414/463 |

FOREIGN PATENT DOCUMENTS

EP 36706 A1 * 9/1981
* cited by examiner

*Primary Examiner* — John Walters
(74) *Attorney, Agent, or Firm* — Owens Tarabichi LLP (57) ABSTRACT

A device for lifting and attaching a wide-base truck tire and wheel to the frame of a road tractor. The device includes a support structure attached to the frame of the vehicle, a channel-shaped support beam attached to a frame of a tractor, a hoist comprising a lifting mechanism, and a structure for holding a wide-base truck tire in conjunction with the channel-shaped support beam.

8 Claims, 6 Drawing Sheets

DEVICE FOR LIFTING AND ATTACHING A TRUCK TIRE AND WHEEL TO A HEAVY FREIGHT VEHICLE

CROSS-REFERENCE TO RELATED APPLICATIONS

This application claims the benefit of provisional Application No. 61/098,740, filed Sep. 19, 2008. The entirety of the foregoing application is incorporated by reference herein.

BACKGROUND OF THE INVENTION

1. Field of the Invention

The invention generally relates to the attachment of a spare tire and wheel to a vehicle or a particular portion of a vehicle. More specifically, in one embodiment, the invention is directed to a device for lifting and attaching a wide-base truck tire and wheel to the underside of a vehicle, such as a heavy freight vehicle like a tractor trailer truck.

2. Description of Related Art

Heavy freight vehicles, such as tractor trailer trucks or semi-trailer trucks, typically carry a spare tire and wheel to use as a replacement when an existing wheel or tire fails. The considerable weight of a wide-base truck tire (e.g., 300 lbs or more) greatly increases the difficulty of moving or lifting a spare tire. Further, in some instances there is little space available on the underside of the tractor portion of the truck to mount a spare. Accordingly, it would be useful to have a device capable of reducing this difficulty and making it easier to utilize a spare wheel and tire. It would also be useful to have a device for lifting and attaching a wheel and tire to the tractor portion of a tractor trailer truck in those instances in which there is not enough room for the tire to fit in the allotted or available space on the frame of the tractor. It would also be useful to have a device for lifting and attaching a wheel and tire to a vehicle that is self-contained and does not require accessories for its operation.

BRIEF SUMMARY OF THE INVENTION

The problem described above is addressed with a device for lifting and attaching a wide-base truck tire and wheel to the frame of a road tractor. In one embodiment, the device includes an attachment structure attached to the frame of a vehicle, a channel-shaped support beam attached to the attachment structure, a hoist with a lifting mechanism, and means for holding a wide-base truck tire in conjunction with said channel-shaped support beam.

In another embodiment, the device includes an attachment structure that is attached in between two I-beams underneath the body of a vehicle or semi-trailer, a channel support beam attached to the attachment structure, a hoist with a lifting mechanism, and a means for holding a wide-base truck tire in conjunction with the channel support beam.

In yet another embodiment, the device includes an attachment structure that is attached in between two I-beams underneath the body of a vehicle or semi-trailer, a channel support beam attached to the attachment structure, a hoist with a lifting mechanism, and a rolling basket assembly for holding a wide-base truck tire in conjunction with the channel support beam.

The invention has many features and benefits. The device is specifically designed to carry the weight of a wide-base tire. The device is designed to fit in the limited space on the tractor frame or on the underside of the trailer. The device allows access to the hoist by an integrated crank handle or a hexagonally-shaped end that can interface with a hand or power tool. The device has a secondary locking feature, the nuts on the cradle, which are not included in products such as SUV tire hoists. The device is self-contained and requires no extra accessories to operate.

DETAILED DESCRIPTION OF THE INVENTION

The following describes various exemplary embodiments of a device for lifting and attaching a tire or a tire and wheel together, such as a spare tire and wheel, to a vehicle or portion of a vehicle. In particular, the following describes various exemplary embodiments of a device for lifting and attaching a wide-base truck tire or tire and wheel together to the underside of a heavy freight vehicle like a tractor trailer truck. Generally, embodiments are described in which the device for lifting and attaching a tire and wheel can be attached to any portion of a vehicle. More specifically, in the case of a tractor trailer truck, embodiments are described in which the device for lifting and attaching a tire or tire and wheel together can be attached to the frame of a tractor or to the underside of the trailer instead of the tractor.

These embodiments are described in conjunction with the accompanying drawings, which are not necessarily drawn to scale. It should be appreciated that the following description is not intended to be limiting, as it will be apparent to one of skill in the art that certain modifications may be made to the various exemplary embodiments. Accordingly, such modifications are intended to be within the scope of the present invention. For example, although many of the following embodiments are described in the context of a tractor trailer truck, it should be appreciated that use of the device for lifting and attaching a tire or a tire and wheel together is not necessarily limited to a tractor trailer truck. Also, as noted, it should be appreciated that the device can be used with a tire or with a tire and wheel together.

Figure 1:
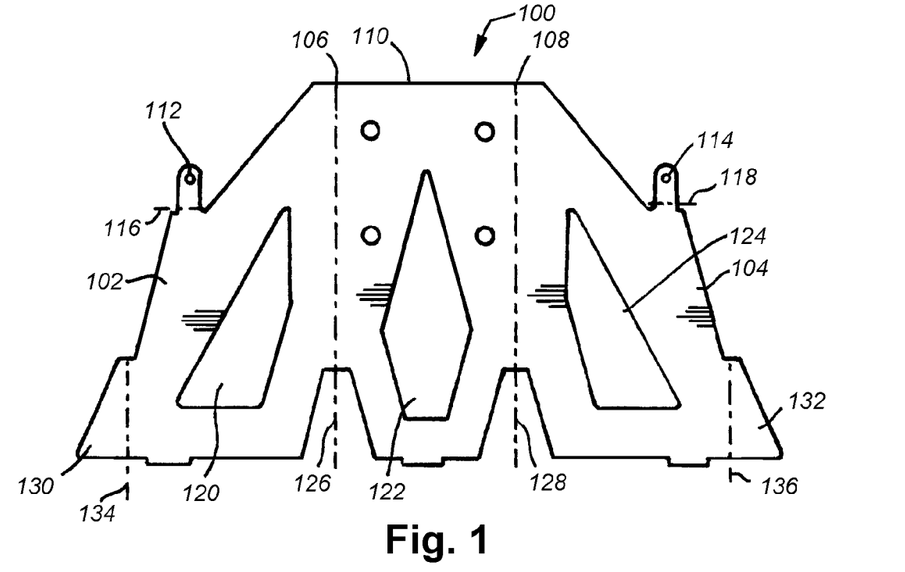
FIG. 1 is a top side view of a flat, blank-length metal plate prior to being configured into a channel-shaped beam according to one embodiment.

FIG. 1 is a top side view of a flat, blank-length metal plate prior to being configured into a channel-shaped beam according to one embodiment. As will be described below, one embodiment of the device for lifting and attaching a spare, either a tire or a tire and wheel combined, is made from a flat blank-length metal plate 100. This plate 100 is generally of a trapezoidal shape. The plate 100 comprises two ends 102, 104 that are ultimately bent along two vertical lines 106, 108 generally into right angles. The plate 100 also comprises a web 110 and two tabs 112, 114 that are ultimately bent along two horizontal lines 116, 118 generally into right angles. After bending, the tabs 112, 114 are orthogonal to both the web 110 and to each of the ends 102, 104 and remain physically attached to and an integral part of each end 102, 104, respectively. In addition, the flat blank-length metal plate 100 comprises two portions 130, 132 that are also bent along vertical lines 134, 136, respectively. The direction in which these portions 130, 132 are bent relative to the ends 102, 104 is more clearly illustrated in FIG. 3 discussed below.

The flat blank-length metal plate 100 has cut-outs 120, 122, 124, 126, 128 of various geometric shapes. These cut-outs 120, 122, 124, 126, 128 lighten the weight of the plate 100 and the channel-shaped beam ultimately formed without compromising its structural integrity or function. In one embodiment, the plate 100 is made of steel. In another embodiment, the plate is made of another suitable material or composite.

Figure 2:
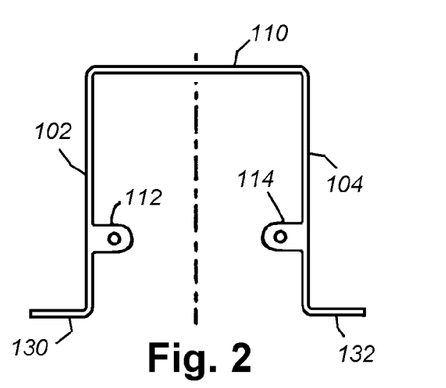
FIG. 2 is a top side view of a channel-shaped beam of FIG. 3 according to one embodiment.
Figure 3:
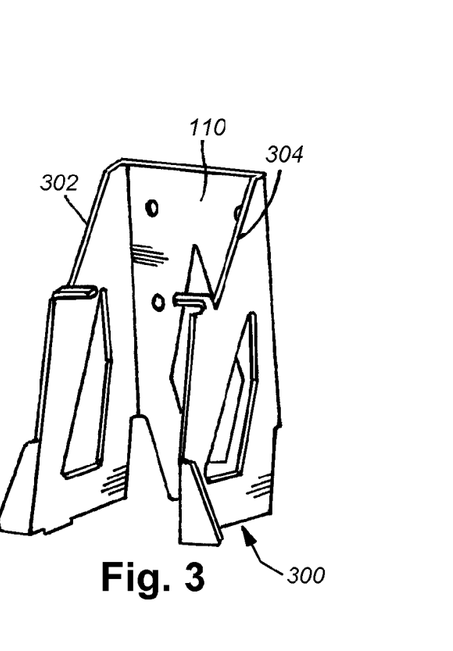
FIG. 3 is a perspective view of the channel-shaped beam of FIG. 2 according to one embodiment.

FIG. 2 is a top side view of a channel-shaped beam of FIG. 3 according to one embodiment, and FIG. 3 is a perspective view of the channel-shaped beam of FIG. 2 according to one embodiment. Starting with FIG. 3, a C-shaped or channel-shaped beam 300 is formed by bending the flat, blank-length metal plate 100 shown in FIG. 1 as described above. After bending the plate 100, the ends 102, 104 form walls or flanges 302, 304 and in connection with the web 110 form the channel-shaped beam 300. Specifically, the two flanges 302, 304 are perpendicular to the web 110 of the channel-shaped beam 300 and are parallel to each other. According to one embodiment, the plate 100 is cut on a laser-cutting machine and bent on a forming machine. According to another embodiment, the plate is cut on a plasma cutter. According to yet another embodiment, the plate is cut on a water-jet cutter.

Due to the approximate trapezoidal shape of the plate 100, it should be appreciated that the height of the flanges 302, 304, as shown in FIG. 3, decreases from the point where the flanges 302, 304 are attached to or integral with the web 110 to the edge of the flanges 302, 304 where the tabs 112, 114 are located. As discussed further below, the web 110 is attached to the frame of the vehicle or road tractor by any means known in the art, including mechanical, chemical, or thermal techniques.

Figure 4:
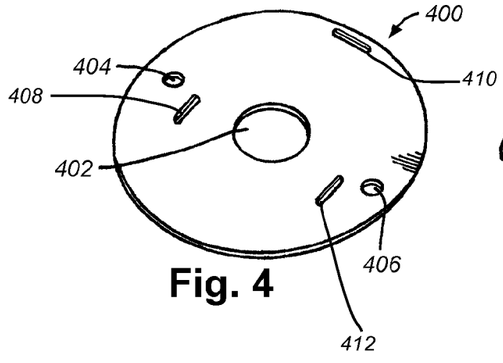
FIG. 4 is a perspective view of a circular plate according to one embodiment.
Figure 5:
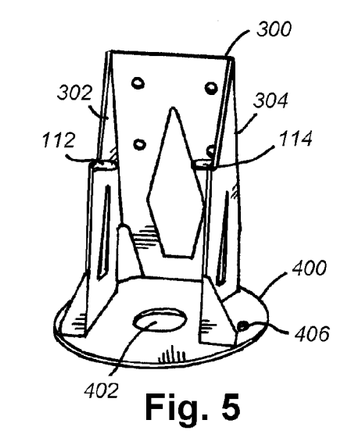
FIG. 5 is a perspective view of the channel-shaped beam of FIG. 3 connected to the circular plate of FIG. 4 according to one embodiment.

FIG. 4 is a perspective view of a circular plate according to one embodiment. The circular plate 400 comprises a metal plate that is circular in shape and designed with a predetermined diameter sufficient to fit level or with even margin inside the wheel of a wide-base truck tire (not shown) or the spare tire and wheel to be held. The circular plate 400 also has three circular holes 402, 404, 406. The center of each hole 402, 404, 406 is positioned on an axis defined by a diameter of the circular plate 400. One hole 402 is located at the center of the circular plate 400, and the other two holes 404, 406 are located equidistant from the center of the circular plate 400, each hole 404, 406 being on opposite sides of the hole 402 located at the center of the circular plate 400. It should be appreciated, as described below in connection with FIG. 5, that the two holes 404, 406 positioned on opposite sides of the hole 402 located at the center of the circular plate 400, are also ultimately positioned outside of the perimeter formed by the walls or flanges 302, 304 of the channel-shaped beam 300, with each of these holes 404, 406 also being positioned adjacent to a one of the flanges 302, 304, respectively, when the circular plate 400 is adjacent to the bottom of the channel-shaped beam 300 as shown in FIG. 5. The circular plate 400 also comprises slits 408, 410, 412. The slits 408, 410, 412 are rectangular cutouts used in the manufacturing process to locate the beam 300 with respect to the circular plate 400. It should be appreciated that since the circular plate 400 is used in securing the tire or tire and wheel together to the device, it should be made of steel or another material able to tolerate the extreme temporary forces caused by an event such as running over a pothole as well as minor but extended forces such as rattling from an out-of-balance tractor. According to one embodiment, the circular plate 400 is cut on a laser-cutting machine and bent on a forming machine. According to another embodiment, the plate is cut on a plasma cutter. According to yet another embodiment, the plate is cut on a water-jet cutter.

FIG. 5 is a perspective view of the channel-shaped beam of FIG. 3 connected to the circular plate of FIG. 4 according to one embodiment. As shown, the channel-shaped beam 300 is mounted onto the circular plate 400 such that the flanges 302, 304 rest between the center hole 402 of the circular plate 400 and the outer holes 404, 406, respectively. The two tabs 112, 114 extend inward and project into the interior of the channel-shaped beam 300 and are parallel to the circular plate 400. The channel-shaped beam 300 can be connected to the circular plate 400 using any means known in the art for connecting two metal pieces, including mechanical, chemical, or thermal techniques.

Figure 6:
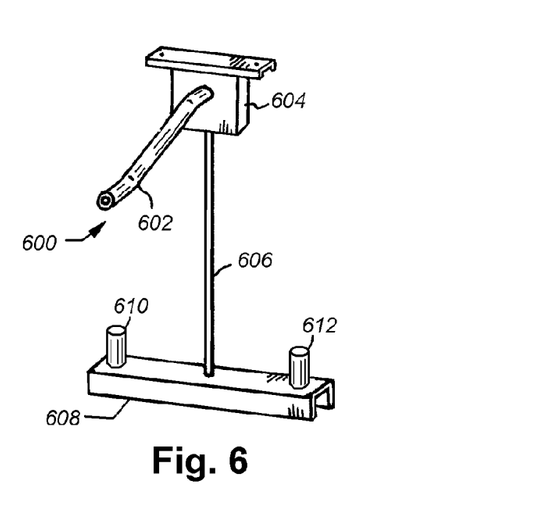
FIG. 6 is a perspective view of a hoist mechanism according to one embodiment.

FIG. 6 is a perspective view of a hoist mechanism according to one embodiment. The hoist mechanism 600 includes a crank handle 602 that is integrated in the hoist mechanism 600 and is attached to a box 604 for receiving and extending a cable 606 and a carrier plate 608 attached to one end of the cable 606. The crank handle 602 may be integrated into the box 604 and in operation transfers lifting power to the hoist cable 606. The carrier plate 608 serves the function of a hoist hook and has two bolts 610, 612 protruding upwards from the ends of the carrier plate 608 that are used to extend through the wheel or a rolling basket described in connection with FIG. 12. The cable 606 passes through a hole in the carrier plate 608 and has a mechanical stop swaged onto it. In operation, this carrier plate 608 will provide the bottom support for the tire and wheel in the upright position, as well as act as the platform on which the tire and wheel will be raised and lowered. It should be appreciated that since the carrier plate is used in securing the tire or tire and wheel together to the device, it should be made of steel or another material able to tolerate the extreme temporary forces caused by an event such as running over a pothole as well as minor but extended forces such as rattling from an out-of-balance tractor wheel. It should also be appreciated that crank handle 602 may comprise a hexagonally-shaped end that can interface with a hand or power tool to assist in turning the crank handle 602.

Figure 7:
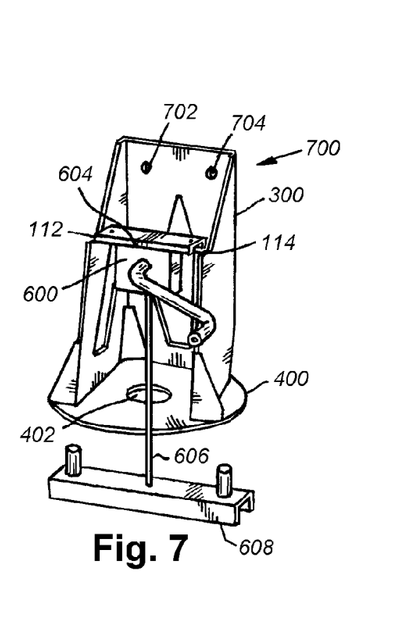
FIG. 7 is a perspective view of the embodiment of FIG. 5 connected to the hoist mechanism of FIG. 6 to form a completed device for lifting and attaching a tire or a tire and wheel together to a vehicle frame according to one embodiment.

FIG. 7 is a perspective view of the embodiment of FIG. 5 connected to the hoist mechanism of FIG. 6 to form a completed device for lifting and attaching a tire or a tire and wheel together to a vehicle frame according to one embodiment. As shown, the hoist mechanism 600 is combined with the channel-shaped beam 300 and the circular plate 400 to form a completed device 700. The tabs 112, 114 are designed to provide support to a hoisting mechanism 600 such that the box 604 of the hoist mechanism 600 is attached to the top face of each these tabs 112, 114. The tabs 112, 114 in conjunction with the circular plate 400 function as a head-frame that holds the hoisting mechanism 600 in place and helps fix its position. Specifically, the box 604 of the hoist mechanism is mounted on the tabs 112, 114 of the channel-shaped beam 300, and the cable 606 extends from the box 604 through the hole 402 in the center of the circular plate 400 and is attached at its end to the carrier plate 608. In operation, the cable 606 is raised and lowered through the center hole 402 of the circular plate 400. It should be appreciated that the bolts 610, 612 align with the holes 404, 406 in the circular plate 400 such that when the cable 606 is refracted into the box 604 the bolts 610, 612 will protrude through the holes 404, 406 of the circular plate 400.

In operation, the overall device is attached to the frame or some other portion of a vehicle using the holes 702, 704, or additional holes not shown, in the channel-shaped beam 300. For example, the device 700 could be bolted to the frame of a vehicle using bolts extended through the holes 702, 704 in the channel-shaped beam 300. In particular, the device 700 could be attached to a tractor. In this case, as well as in connection with the attachment to other vehicles, the device 700 can be positioned on the vehicle based upon the space occupied by a tire or tire and wheel once secured by the device relative to other components of the vehicle. For example, the location of the tire in the upright and locked position could be adjusted, for example, at varying distances from the drive shaft of a tractor, which would enhance clearance in tight packaging spots. The attachment of the device is discussed further in connection with FIGS. 8-11.

Once mounted, the cable 606 is extended using the crank handle 602 to release the cable 606 and carrier plate 608. The carrier plate 608 is dropped through the center hole of a wide base wheel and aligned so that the bolts protrude upwards through the wheel. The crank handle 602 is then used to retract the cable 606 into the box 604, thereby raising the wheel off the ground. Once the cable 606 is sufficiently retracted, the bolts 610, 612 of the carrier plate 608 are inserted into and protrude upwards through the two outside holes 404, 406 of the circular plate 400, and the crank handle is used to continue refracting the cable 606 until the wheel is sufficiently flush against the bottom of the circular plate 400 and makes contact with its bottom surface. The bolts 610, 612 are then secured in place with nuts (not shown), so that the weight of the wheel is directly transmitted to the channel-shaped beam 300 and not to the hoist mechanism 600. It should be appreciated that when used in connection with a tire alone without a wheel, a rolling basket assembly described in connection with FIG. 12 may be used in place of the wheel and through which the bolts 610, 612 will extend.

With reference to the preceding figures, the channel-shaped beam 300 is designed to connect the mechanism with the frame of the vehicle or tractor and to provide the means of support and attachment point for a wide-base truck tire. The circular plate 400 is designed to provide an upper support barrier to stabilize a wide-base tire in the fully raised position. The carrier plate 608 is designed to provide a lower support for a wide-base tire and aid in the lifting and lowering of the tire. The hoist mechanism 600 contributes to the lifting and lowering motion of the device. The crank handle 602 allows the device to be fully self-contained and, therefore, requires no additional assembly to operate. The channel-shaped beam 300 and the circular plate 400 are joined to provide structural support serving the function of a head-frame. Together they provide a rigid and stable attachment point to which the carrier plate 608 is attached to the lower end of the hoist cable 606. When the hoist mechanism 600 is operated, it engages the carrier plate 608 with the lower section of the wheel lifting or lowering it.

The device overall, therefore, provides the structural support and rigidity necessary to raise and lower a wide-base truck tire, which is heavier than standard issue truck tires, while keeping the tire firmly in place while the vehicle is at rest or in motion. Among other things, it is unique in that the channel-shaped beam 300 is shaped of a single metal plate and directly attached to the frame rail of a road tractor. It is also unique in that, unlike other hoist mechanisms, the crank handle 602 is integrated into the device.

In some alternative embodiments, the hoist mechanism 600 could be replaced by a jack screw or a different lifting mechanism. The carrier plate 608 could be replaced by some other means, such as hooks at the end of the lifting medium, which would still allow the hoist to engage and lift the tire when activated. The circular plate 400 may not necessarily be a circle but can be various shapes that can still provide upper structural support for the tire. The channel-shaped beam 300 may be manufactured from not just one plate folding at different places but may be made of single individual plates welded or joined together by other methods known in the art to provide the same overall function. In another embodiment, the circular plate 400 and carrier plate 608 have a different shape than that described above and provide a means by which the mechanism is able to secure a tire or tire and wheel together to the device and attach securely to the tractor while maintaining its structural integrity and rigidity. In one embodiment, the bolts 610, 612 on the carrier plate 608 are replaced by any mechanism that guides and/or secures the tire in the upright position, such as clamps. In other embodiments, the circular plate 400 includes slots rather than circular holes to allow a supportive bar or beam to pass through and allow for additional support. In one embodiment, the crank handle 602 has a different shape than described above that allows for a user to hold and turn the crank handle 602. It should be appreciated that the crank handle 602 may have any shape suitable for allowing a user to hold and turn the crank handle 602 to provide lifting power to the hoist cable 606 in order to lift the carrier plate 608. In one embodiment, the carrier plate 608 is a flat bar or other elongated shape that provides support to the lower part of the tire or tire and wheel together. In yet another embodiment, the device includes one plate that provides structure, attaches the device to the tractor, and secures the tire in the upright position.

Figure 8:
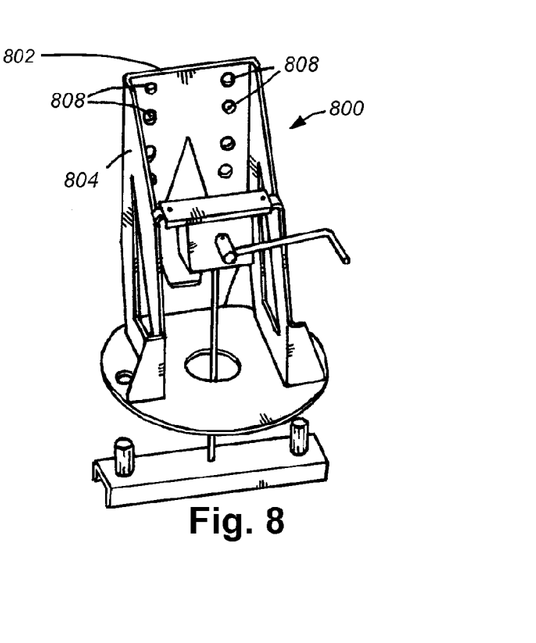
FIG. 8 is perspective view of a device for lifting and attaching a tire or a tire and wheel together to a vehicle frame according to another embodiment.

FIG. 8 is perspective view of a device for lifting and attaching a tire or a tire and wheel together to a vehicle frame according to another embodiment. The device 800 is similar to the device shown in FIG. 7 except that a web 802 of a channel-shaped beam 804 has multiple sets of holes 808. These holes 808 may be used to mount the device 800 to a vehicle. In particular, these holes 808 provide the ability to mount the device 800 at different vertical positions. The vertical height of the device 800 could be adjusted to account for wheels having different offsets.

Figure 9:
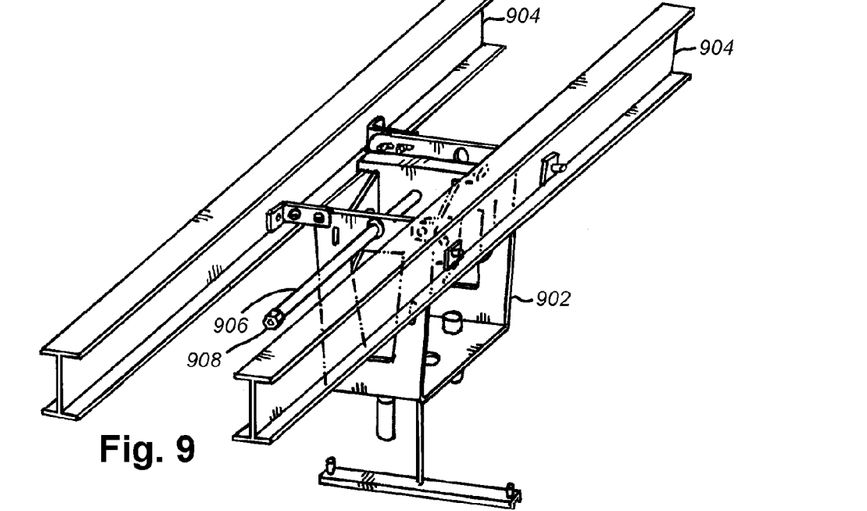
FIG. 9 is a perspective view of a device for lifting and attaching a tire or a tire and wheel together to a vehicle frame attached to a pair of I-beams according to another embodiment.

FIG. 9 is a perspective view of a device for lifting and attaching a tire or a tire and wheel together to a vehicle frame attached to a pair of I-beams according to another embodiment. In particular, FIG. 9 illustrates the attachment of a device 902 made according to any of the foregoing embodiments to the underside of a semi-trailer, as opposed to attached to the tractor. This embodiment shares the same hoist mechanism 600 with the tractor embodiment, but has different attachment features to allow it to attach, via mechanical, chemical, or thermal means, to the I-beam structures 904 present under a semi-trailer. As shown, the device 902 is attached in between two I-beam structures 904 in the manner as described below in the description of FIGS. 10 and 11. In the embodiment illustrated in FIG. 9, the device 902 is configured such that the device 902 is able to be affixed to the vehicle frame via the top portion of the device 902 thereby allowing the hoist mechanism 600 to extend downward relative to the device 902. The tire is raised or lowered by rotating the hoist actuation bar 906. This bar has a hexagonal section 908 at its exposed end, allowing the operator to turn it rapidly using either a hand tool or a power-assisted drill or impact driver. Any known means can be used to attach the device 902 to the I-beam structures, some of which are shown in connection with FIGS. 10 and 11.

Figure 10:
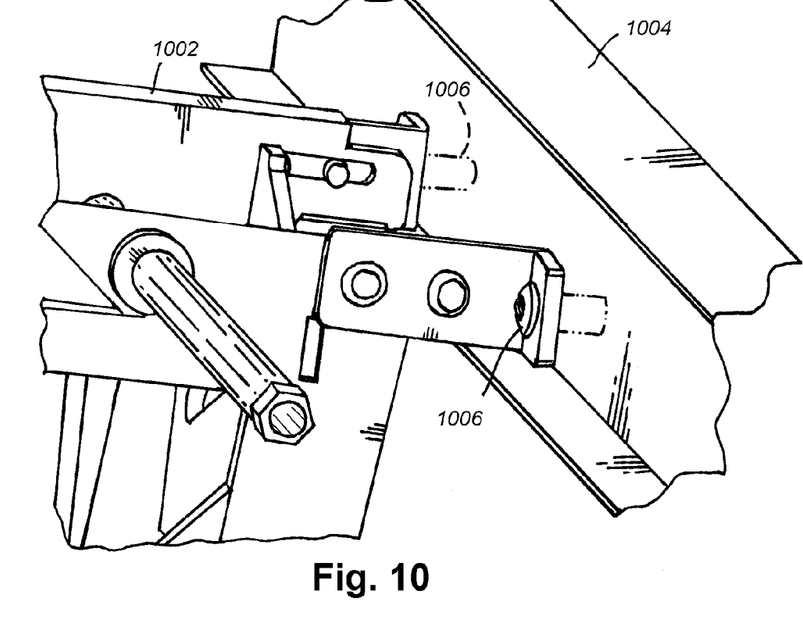
FIG. 10 is a perspective view of a portion of the device and I-beam of FIG. 9.

FIG. 10 is a perspective view of a portion of the device and I-beam of FIG. 9. In particular, FIG. 10 illustrates the attachment of a device 1002 made according to any of the foregoing embodiments to the I-beam structures 1004 present under a semi-trailer. In this embodiment, the device 1002 is attached by inserting mechanical fasteners 1006, such as bolts, through holes drilled through the I-beam structures 1004.

Figure 11:
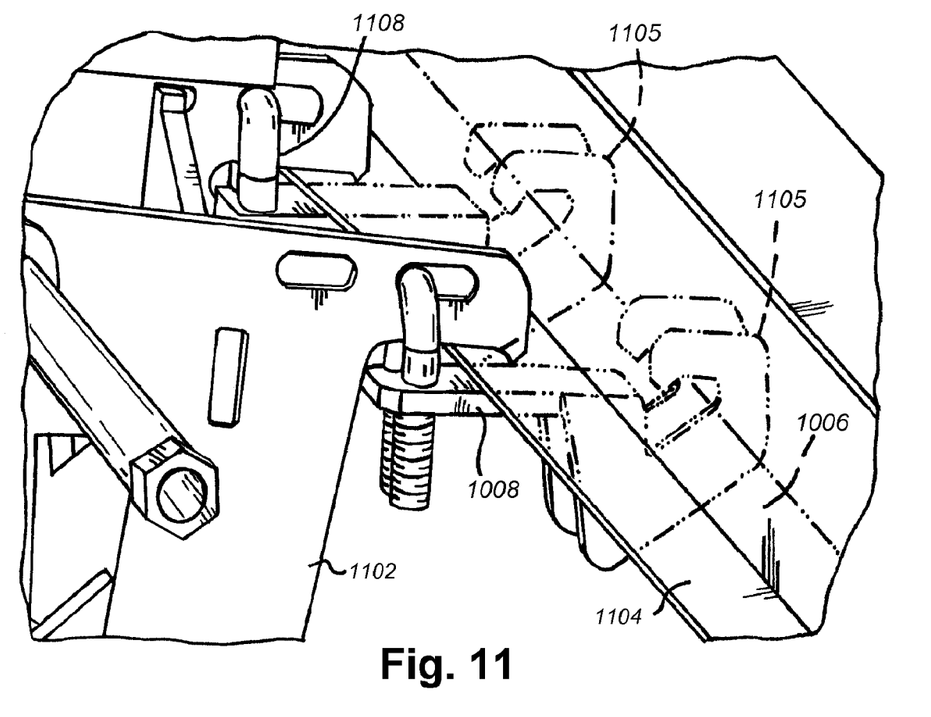
FIG. 11 is a perspective view of a portion of a device for lifting and attaching a tire or a tire and wheel together to a vehicle frame attached to a portion of an I-beam.

FIG. 11 is a perspective view of a portion of a device for lifting and attaching a tire or a tire and wheel together to a vehicle frame attached to a portion of an I-beam. In particular, FIG. 11 illustrates the attachment of a device 1102 made according to any of the foregoing embodiments to the I-beam structures 1104 present under a semi-trailer. In this embodiment, the device 1102 is attached using clamps 1105 that tighten down upon the lower flange 1106 of the I-beam 1104 when threaded fasteners 1108 are tightened. This method of attachment achieves robust fastening and does not require holes to be drilled through the I-beams.

Figure 12:
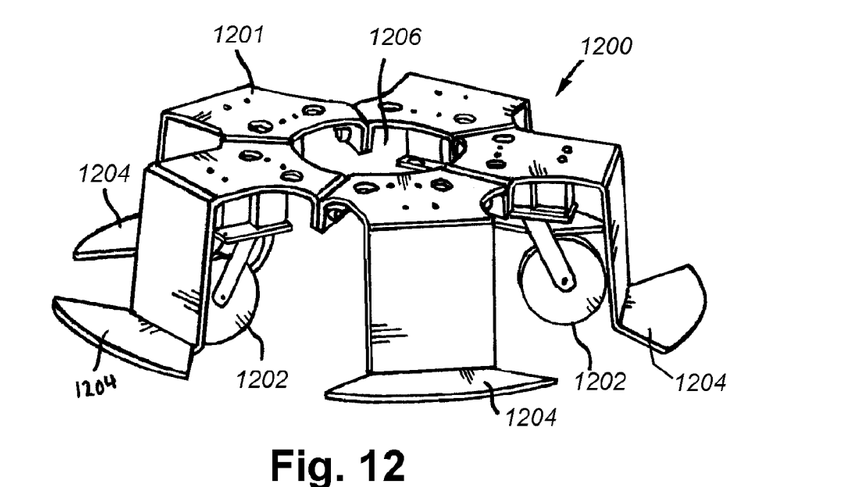
FIG. 12 is a perspective view of a rolling basket assembly according to one embodiment.

FIG. 12 is a perspective view of a rolling basket assembly according to one embodiment. The rolling basket assembly 1200 allows for easy transport of the wheel and tire once it has been lowered to the ground. The rolling basket assembly 1200 comprises a body 1201 and caster wheels 1202 that make the assembly mobile once it is on the ground. The body comprises flanges 1204 upon which a tire can rest. This rolling basket assembly 1200 also makes it possible to carry only a tire instead of a tire and wheel combination, as the basket assembly 1200 can take the place of the wheel in being bolted securely to the attachment on the underside of the trailer once it is hoisted up into place. Accordingly, a carrier plate can be inserted through the center hole 1206 in the same manner as if this hole were the center hole of a wheel. In one embodiment, the rolling basket assembly 1200 is made from steel. In other embodiments, the rolling basket assembly 1200 is made from another suitable material or composite.

It should be appreciated that the device for lifting and attaching a tire or a tire and wheel together is particularly useful when there is not enough room for the tire to fit in the allotted space on the frame of the tractor. In this case, only the device itself needs space to be mounted on the tractor. In some embodiments, the hoist should have a lifting capacity of over 300 pounds. Also, access to hoist needs to have enough inches of clearance for wide-base tires. No particular materials are needed for the various components of the invention; however, each should be of a strength necessary to perform its function. The invention may also be used to hold smaller tires or other objects with a similar size hole near the center.

Figure 13:
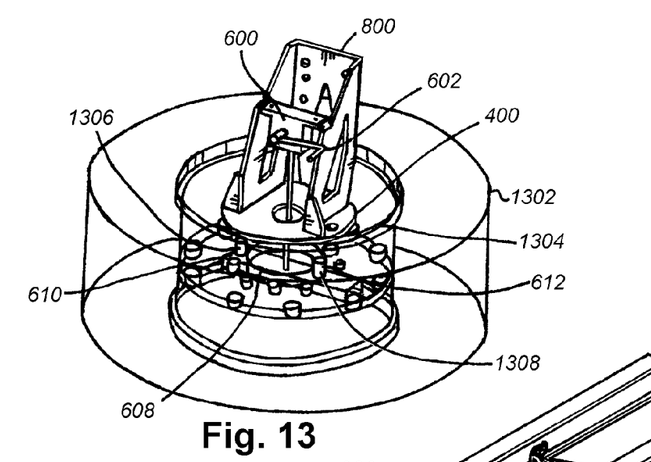
FIG. 13 is a perspective view of the embodiment illustrated in FIG. 8 with a tire or a tire and wheel together according to one embodiment.

FIG. 13 is a perspective view of the embodiment illustrated in FIG. 8 with a tire or a tire and wheel together according to one embodiment. As shown in FIG. 13, the device 800 is connected to the hoist mechanism 600 and circular plate 400 and attaches a tire 1302 or tire 1302 and wheel 1304 to a vehicle frame or tractor. The device 800 is attached to the vehicle frame or tractor as described above. The bolts 610, 612 of the carrier plate 608 of the hoist mechanism 600 are inserted into and protrude upward through the holes 1306, 1308 of the wheel 1304 while the carrier plate 608 provides lower support to the tire 1302 or tire 1302 and wheel 1304. It should be noted that the embodiment illustrated in FIG. 13 shows the device 800 is a semi-engaged position. Upon manipulating the crank handle 602 to allow the circular plate 400 and carrier plate 608 to be in a fully engaged position, the device 800 would therefore be recessed into the cavity of the wheel 1304. In other words, as the crank handle 602 is used to pull the cable upwards, the tire 1302 and wheel 1304, resting on the carrier plate 608, will also be pulled upwards and around the device 800, as the device 800 is sized to fit within the cavity of the wheel 1304. It should be appreciated that the above description for attaching a tire or tire and wheel together as described with regard to FIG. 8 can also be used for the embodiment shown in FIG. 7.

Figure 14:
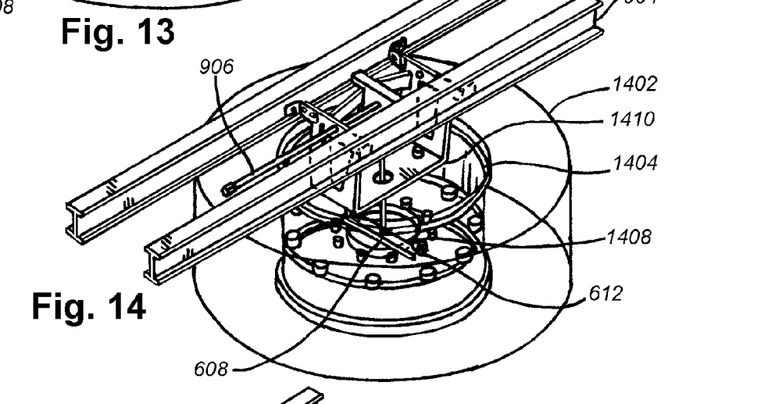
FIG. 14 is a perspective view of the embodiment illustrated in FIG. 9 with a tire or a tire and wheel together according to one embodiment.

FIG. 14 is a perspective view of the embodiment illustrated in FIG. 9 with a tire or a tire and wheel together according to one embodiment. As illustrated in FIG. 14, the device 902 is connected to the hoist mechanism 600 and attaches a tire 1402 or tire 1402 and wheel 1404 to a vehicle frame or tractor. The device 902 is attached inbetween two I-beams 904 present under a semi-trailer. Similar to the manner described above in the description for FIG. 13, the bolts 610 (not shown), 612 of the carrier plate 608 of the hoist mechanism 600 are inserted into and protrude upward through the holes 1408 of the wheel 1404 while the carrier plate 608 provides lower support to the tire 1402 or tire 1402 and wheel 1404. It should be noted that the embodiment illustrated in FIG. 14 shows the device 902 is in a semi-engaged position. Upon manipulating the hoist actuation bar 906 to allow the bottom portion 1410 of the device 902 to be in a fully engaged position, the device 902 would therefore be recessed into the cavity of the wheel 1404. In other words, as the hoist actuation bar 902 is used to pull the cable upwards, the tire 1402 and wheel 1404, resting on the carrier plate 608, will also be pulled upwards and around the device 800, as the device 902 is sized to fit within the cavity of the wheel 1404.

Figure 15:
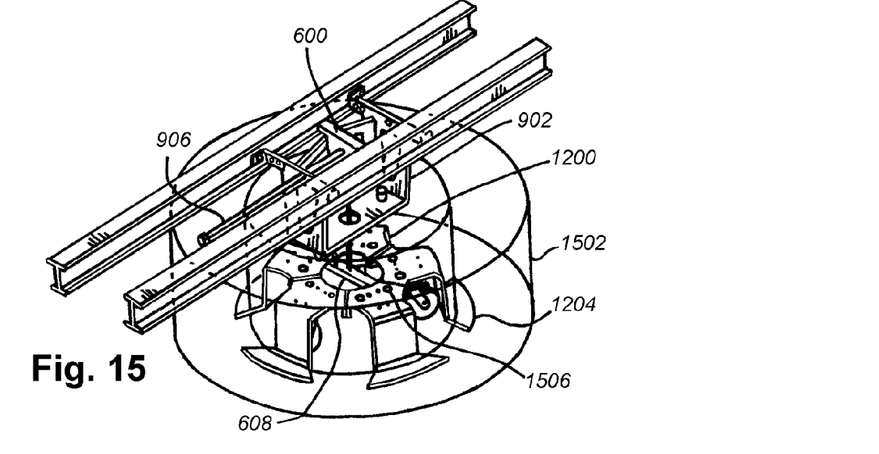
FIG. 15 is a perspective view of the device of FIG. 9 and the rolling basket assembly of FIG. 12 with a tire according to one embodiment.

FIG. 15 is a perspective view of the device of FIG. 9 and the rolling basket assembly of FIG. 12 with a tire according to one embodiment. The device 902 is connected to the hoist mechanism 600 and attaches a tire 1502 to a vehicle frame or tractor. The device 902 is attached inbetween two I-beams 904 present under a semi-trailer. The bolts 610, 612 (not shown) of the carrier plate 6-8 of the hoist mechanism 600 are inserted into and protrude upward through the holes 1506 of the rolling basket assembly 1200 while the carrier plate 608 provide lower support to the rolling basket 1200. The body 1201 of the rolling basket assembly 1200 is contained within the center cavity of the tire 1502, and the flanges 1204 of the rolling basket assembly 1200 provide support to the tire shows the device 902 and rolling basket assembly 1200 in a semi-engaged position. Upon manipulating the hoist actuation bar 906 to allow the bottom portion 1412 of the device 902 to be in a fully engaged position, the device 902 would therefore be recessed into the cavity of the tire 1502. In other words, as the hoist actuation bar 902 is used to pull the cable upwards, the tire 1402 will also be pulled upwards and around the device 800, as the device 902 is sized to fit within the cavity of the wheel 1404.

Figure 16:
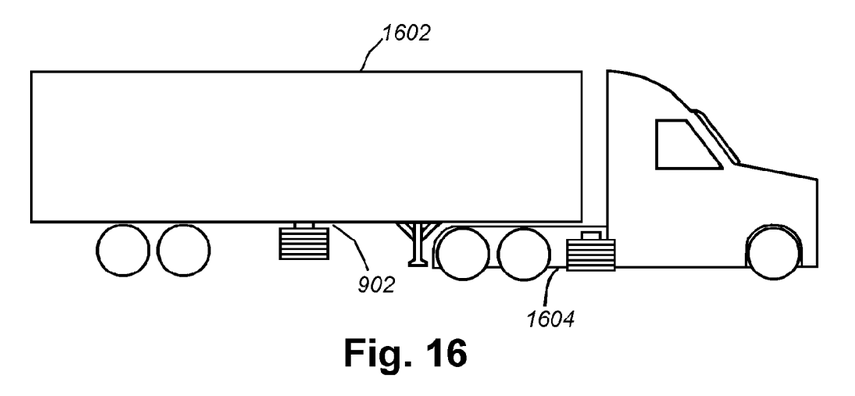
FIG. 16 is a side view of a vehicle illustrating the use of the devices of FIGS. 8 and 9 for lifting and attaching a tire or tire and wheel together to the vehicle according to one embodiment.

FIG. 16 is a side view of a vehicle illustrating the use of the devices of FIGS. 8 and 9 for lifting and attaching a tire or tire and wheel together to the vehicle according to one embodiment. As illustrated in FIG. 16, in one embodiment the device 902 is affixed underneath the body of a semi-trailer of the vehicle 1602. In another embodiment, the device 800 is attached to the side of the vehicle or tractor frame 1604.

Figure 17:
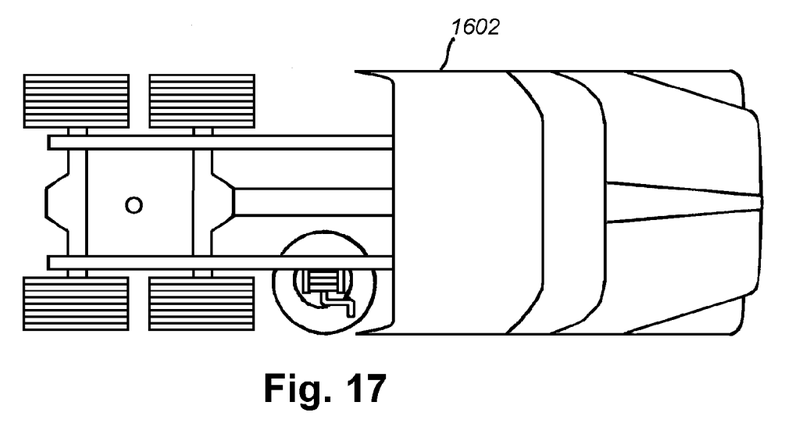
FIG. 17 is a top side view illustrating the use of the device of FIG. 8 for lifting and attaching a tire or tire and wheel together to a vehicle according to another embodiment.

FIG. 17 is a top side view illustrating the use of the device of FIG. 8 for lifting and attaching a tire or tire and wheel together to a vehicle according to another embodiment. FIG. 17 also illustrates a top side view of the tractor portion of FIG. 16. The device 800 is mounted to the side of the vehicle or tractor frame 1604 of the vehicle 1602 and attaches the tire 1302 or tire 1302 and wheel together to the frame 1604 of the vehicle 1602. As shown in this top side view illustration, the attached tire or tire and wheel together is tucked away within the recessed portion of the vehicle 1602.

Figure 18:
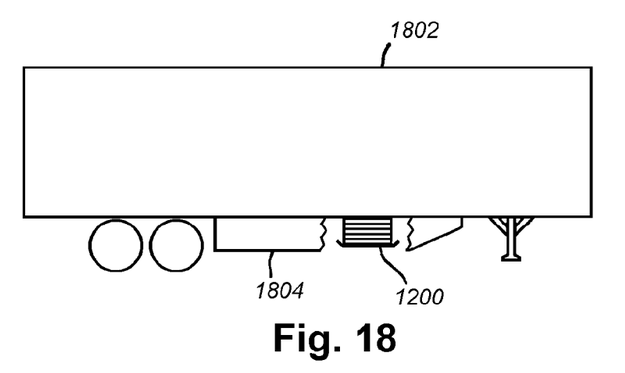
FIG. 18 is a side view of a vehicle illustrating the use of the devices of FIGS. 9 and 12 for lifting and attaching a tire or tire and wheel together to the vehicle according to one embodiment.

FIG. 18 is a side view of a vehicle illustrating the use of the devices of FIGS. 9 and 12 for lifting and attaching a tire or tire and wheel together to the vehicle according to one embodiment. In this embodiment, the semi-trailer 1802 includes side skirts 1804 on each side of the semi-trailer 1802. Since the side skirts 1804 extend from the trailer body 1804 downward toward the ground, it is difficult to mount a spare tire under the trailer 1804 or to remove a spare tire held under the trailer 1804 without removing the side skirt 1804. By using the rolling basket assembly 1200 described in connection with FIG. 12, a tire or tire and wheel together can be easily moved under the side skirt 1804 without having to remove it. Accordingly, this allows use of the device for lifting and attaching a tire or a tire and wheel together to a vehicle frame according to any of the embodiments described above under the trailer 1802. More specifically, in mounting a spare tire or tire and wheel under the trailer 1802, the spare can be placed on the rolling basket and rolled under the side skirt 1804 to under the trailer 1802. The hoist mechanism can then be operated as described above to mount the spare on the device. Similarly, a spare already mounted under the trailer 1802 using the device for lifting and attaching a tire or a tire and wheel together to a vehicle frame according to any of the embodiments described above can be operated to drop the spare onto the rolling basket 1200, which can then easily be rolled under the side skirt 1804 from under the trailer 1802 for use in replacing an existing tire.

Various embodiments have been described above. The descriptions are intended to be illustrative of various embodiments of the present invention and are not intended to be limiting. It will be apparent to one of skill in the art that modifications may be made to the invention as described without departing from the scope of the claims set out below.

For example, it is to be understood that although embodiments have been described in the context of a tractor or trailer, the device can be used with other vehicles. Also, the particular shapes and materials of construction described above are not to be construed as limiting as one of skill in the art will appreciate that other shapes and materials can be used.

What is claimed is:

1. A device for lifting and holding a wide-base truck tire and wheel to—a road tractor or semi-trailer, comprising:
    a support beam configured to be attached to a portion of a road tractor or semi-trailer;
    a circular plate fixedly attached to said support beam, wherein said circular plate is configured to fit within the wheel of a truck tire;
    a hoist attached to said support beam;
    a carrier plate; and
    a cable having a first end attached to said hoist and an opposite second end attached to said carrier plate such that operation of said hoist extends and retracts said cable and said carrier plate.

2. The device of claim 1, wherein said carrier plate comprises at least two bolts that extend in the same direction from said carrier plate and are positioned to extend through at least two holes defined by a wheel of a truck tire, and wherein said circular plate defines a center hole through which said cable passes and at least two holes configured to receive said two bolts on said carrier plate.

3. The device of claim 2, further comprising a basket assembly that holds a tire and a wheel, wherein said basket assembly defines a center hole through which said cable passes and at least two holes configured to receive said two bolts on said carrier plate.

4. A device for lifting and holding a wide-base truck tire and wheel to—a road tractor or semi-trailer, comprising:
    a support beam configured to be attached to a portion of a road tractor or semi-trailer, wherein said support beam defines a plurality of holes for attachment to portion of the road tractor or semi-trailer;
    a circular plate fixedly attached to said support beam;
    a hoist attached to said support beam;
    a carrier plate; and
    a cable having a first end attached to said hoist and an opposite second end attached to said carrier plate such that operation of said hoist extends and retracts said cable and said carrier plate.

5. A device for lifting and holding a wide-base truck tire and wheel to a frame of a semi-trailer, comprising:
    a support beam configured to be attached to each of, and in between, a pair of parallel I-beams disposed on an underside of a semi-trailer;
    a hoist attached to said support beam;
    a carrier plate;
    a cable having a first end attached to said hoist and an opposite second end attached to said carrier plate such that operation of said hoist extends and retracts said cable and said carrier plate;
    a semi-trailer having an underside and a pair of parallel I-beams disposed on said underside; and
    wherein said hoist comprises a hoist actuation bar disposed parallel to, and in between, said pair of parallel I-beams.

6. The device of claim 5, further comprising a plurality of clamps that attach opposite portions of said support beam to corresponding flanges of each of said I-beams.

7. A system for moving a tire and wheel and lifting and holding the tire and wheel to a road tractor or semi-trailer, comprising:

a device configured for lifting and holding a tire and wheel and for attachment to a portion of a road tractor or semi-trailer; and a basket assembly configured to hold the tire and wheel removably attached to said device, wherein said basket assembly comprises a body that holds the tire and wheel and that is removably attached to said device, a set of caster wheels disposed under said body to allow said body to roll while holding the tire and wheel, and a plurality of flanges upon which the tire and wheel rest.

8. A system for moving a tire and wheel and lifting and holding the tire and wheel to a road tractor or semi-trailer, comprising:

a device configured for lifting and holding a tire and wheel and for attachment to a portion of a road tractor or semi-trailer, wherein said device comprises a support beam configured to be attached to a portion of the road tractor or semi-trailer; a hoist attached to said support beam; a carrier plate; and a cable having a first end attached to said hoist and an opposite second end attached to said carrier plate such that operation of said hoist extends and retracts said cable and said carrier plate, wherein said support beam is configured to be attached to each of, and in between, a pair of parallel I-beams disposed on an underside of a semi-trailer; wherein said hoist comprises a hoist actuation bar disposed parallel to, and in between, said pair of parallel I-beams; and wherein said carrier plate comprises at least two bolts that extend in the same direction from said carrier plate and are positioned to extend through at least two holes defined by the wheel; and a basket assembly configured to hold the tire and wheel removably attached to said device, wherein said basket assembly defines a center hole through which said cable passes and at least two holes configured to receive said two bolts on said carrier plate.

* * * * *